United States Patent
Casimiro et al.

(10) Patent No.: US 10,745,594 B2
(45) Date of Patent: *Aug. 18, 2020

(54) PEELABLE ADHESIVE COMPOSITION

(71) Applicant: BOSTIK SA, La Plaine Saint Denis (FR)

(72) Inventors: Jessie Casimiro, Brie Comte Robert (FR); Eric Verscheure, Vernou la Celle sur Seine (FR)

(73) Assignee: BOSTIK SA, Colombes (FR)

( * ) Notice: Subject to any disclaimer, the term of this patent is extended or adjusted under 35 U.S.C. 154(b) by 63 days.

This patent is subject to a terminal disclaimer.

(21) Appl. No.: 14/731,693

(22) Filed: Jun. 5, 2015

(65) Prior Publication Data

US 2015/0353783 A1   Dec. 10, 2015

(30) Foreign Application Priority Data

Jun. 5, 2014 (FR) ..................... 14 55130

(51) Int. Cl.

| | | |
|---|---|---|
| *C09J 123/08* | (2006.01) | |
| *C09J 133/12* | (2006.01) | |
| *C09J 175/04* | (2006.01) | |
| *C09J 175/06* | (2006.01) | |
| *C09J 107/02* | (2006.01) | |
| *C08K 3/26* | (2006.01) | |
| *B32B 37/12* | (2006.01) | |
| *B32B 38/10* | (2006.01) | |
| *C09D 5/20* | (2006.01) | |
| *C09D 133/04* | (2006.01) | |
| *C09J 133/02* | (2006.01) | |
| *C09D 123/08* | (2006.01) | |
| *C09J 107/00* | (2006.01) | |
| *C09D 175/04* | (2006.01) | |
| *C09J 133/08* | (2006.01) | |
| *C09J 133/10* | (2006.01) | |

(52) U.S. Cl.
CPC ............. *C09J 107/02* (2013.01); *B32B 37/12* (2013.01); *B32B 38/10* (2013.01); *C08K 3/26* (2013.01); *C09D 5/20* (2013.01); *C09D 123/08* (2013.01); *C09D 133/04* (2013.01); *C09D 175/04* (2013.01); *C09J 107/00* (2013.01); *C09J 123/08* (2013.01); *C09J 133/02* (2013.01); *C09J 133/08* (2013.01); *C09J 133/10* (2013.01); *C09J 175/04* (2013.01); *B32B 2309/08* (2013.01); *C08G 2170/80* (2013.01); *C08K 2003/265* (2013.01)

(58) Field of Classification Search
CPC ...... C09J 107/00; C09J 107/02; C09J 123/08; C09J 133/02; C09J 133/08; C09J 133/10; C09J 175/04
See application file for complete search history.

(56) References Cited

U.S. PATENT DOCUMENTS

| | | | | |
|---|---|---|---|---|
| 4,814,168 | A * | 3/1989 | Sablotsky | A61F 13/0276 424/448 |
| 7,850,870 | B2 * | 12/2010 | Ahn | C08K 5/55 252/500 |
| 2010/0120931 | A1* | 5/2010 | Zajaczkowski | C09J 133/14 521/134 |
| 2013/0066004 | A1* | 3/2013 | Kawaguchi | C09J 133/06 524/425 |
| 2013/0137813 | A1* | 5/2013 | Okada | C09J 133/064 524/522 |
| 2013/0168018 | A1 | 7/2013 | Casimiro et al. | |
| 2014/0352887 | A1 | 12/2014 | Casimiro et al. | |

FOREIGN PATENT DOCUMENTS

| | | | | |
|---|---|---|---|---|
| FR | 2984906 A1 | 6/2013 | | |
| WO | WO 0023285 A1 * | 4/2000 | | B42F 5/00 |

OTHER PUBLICATIONS

French Search Report for FR-14/55.130 dated Jan. 20, 2015.

* cited by examiner

*Primary Examiner* — Karuna P Reddy

(74) *Attorney, Agent, or Firm* — Millen, White, Zelano and Branigan, P.C.

(57) ABSTRACT

The invention relates to an adhesive composition comprising at least one latex and at least one polymer composition having a glass transition temperature ranging from −50° C. to 0° C., said adhesive composition being particularly suitable for bonding flexible surface coverings having a high dimensional variability.

The invention also relates to a membrane obtained after drying of the adhesive composition according to the invention, a combination of a flexible surface covering with an adhesive composition according to the invention, a method of application of a flexible surface covering onto a substrate as well as a substrate covered with a peelable adhesive membrane according to the invention.

11 Claims, 5 Drawing Sheets

Fig 3
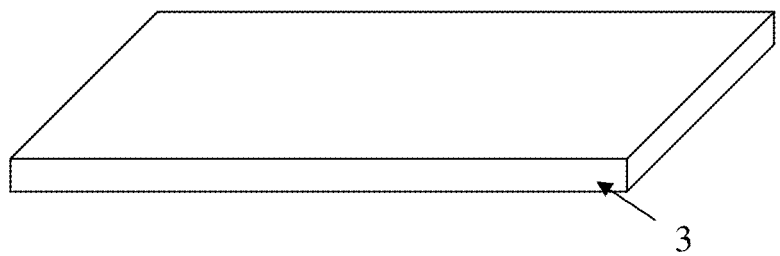
Fig 3a
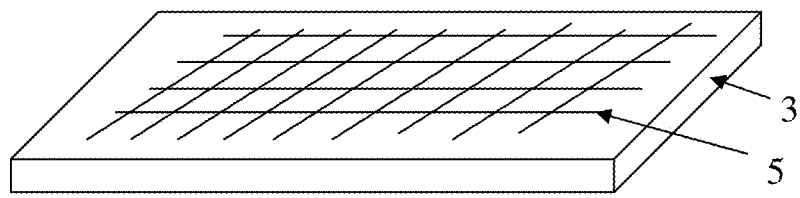
Fig 3b
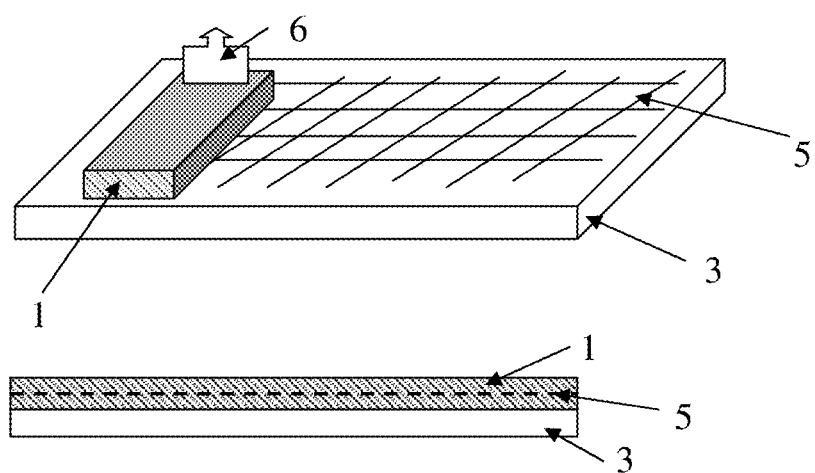
Fig 3c
Fig 3d
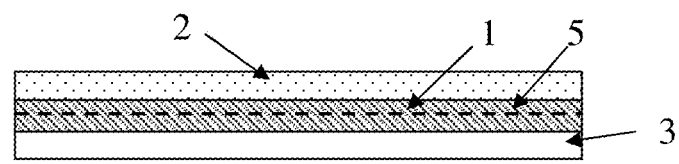
Fig 3e Fig 5
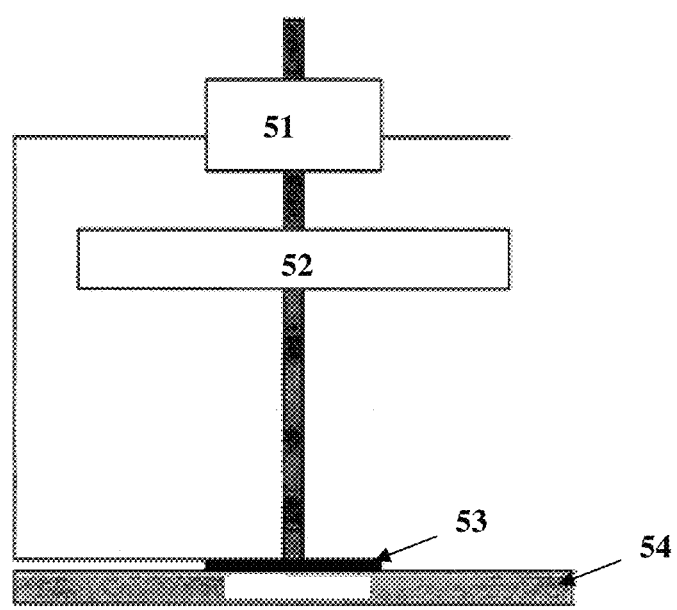
Figure 5a
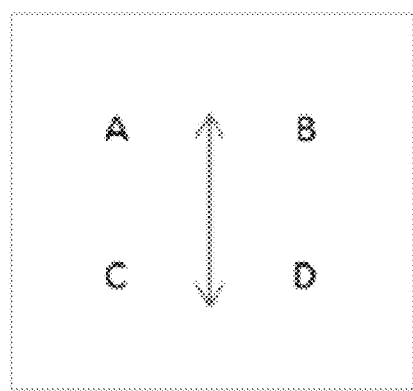
Fig 5b

PEELABLE ADHESIVE COMPOSITION

TECHNICAL FIELD

The present invention relates to a peelable adhesive composition. The invention also relates to a peelable membrane obtained by drying the adhesive composition according to the invention. A subject of the invention is also the combination of a surface covering with the peelable adhesive composition, and a method for applying a surface covering. The invention also relates to a method for renovating a surface covering. The invention also relates to the use of the peelable adhesive composition for holding a flexible surface covering having a maximum dimensional variability measured according to the Freudenberg test greater than or equal to 0.2%.

STATE OF THE ART

The replacement of a flexible floor covering is an operation which has for a long time posed numerous problems to professionals and individuals.

Solutions for the non-permanent fixing of the covering exist, either by the use of double-sided adhesive tapes or by the use of a fixing agent constituted by a pressure-sensitive adhesive. These solutions allow a rapid renovation of premises but they are to be reserved for living areas with low traffic. In fact the strength of the fixing and the durability of the bonding are low. Moreover, the use of double-sided adhesive tapes causes excessive thicknesses which can lead to blisters when furniture is moved, or give rise to marks on the PVC (known as "ghosting").

In the case of a fixing using standard adhesives which is the common solution at present, replacement for renovation of a previously-bonded flexible floor covering (for example a carpet), involves a succession of time-consuming and tedious steps before it is possible to bond a new covering. Firstly the old coverings have to be taken up by force, then the adhesive residues have to be removed. So this must be carried out either using manual tools (scrapers) or with the assistance of a stripper or solvent-based remover.

In case of unevenness it is also necessary to sand and level the floor using a levelling compound before it is possible to apply a new layer of adhesive in order to fix the new covering.

Moreover, adhesive and potentially residues of inorganic binder such as levelling agent remain stuck to the old covering, which constitutes an obstacle to its recycling.

In the case of large surface areas such as commercial premises, the replacement of the covering will require closure of the premises for a relatively long time which is necessary for all of the renovation steps.

Flexible floor coverings made of rubber are used in numerous types of high-traffic premises such as airports or hospitals. Due to their rigidity, this type of coverings deteriorates less rapidly than PVC-type flexible flooring. However, coverings made of rubber are more difficult to bond as they are sensitive to temperature variations and are therefore more deformable. In fact, when the flexible rubber covering is bonded with an adhesive that is too soft or unsuitable, the adhesive follows the variations in the covering and does not hold it. Blistering and bulging phenomena at the joints are then observed right from the first few hours following the adhering of the covering.

Most standard acrylic adhesives do not allow coverings made of rubber to be bonded, as they are too soft and do not have sufficient affinity with rubber. Furthermore, these adhesives do not allow subsequent removal of the covering without leaving residues either on the floor or on the covering.

The application EP 2610317 describes a peelable adhesive composition comprising from 6 to 28% by weight of dry matter of natural latex and from 10 to 40% by weight of dry matter of a polymer composition having a glass transition temperature ranging from −50° C. to 0° C. This application states that for coverings having significant dimensional variability, (e.g. coverings made of rubber), it is preferable to apply a standard adhesive in addition to the peelable adhesive composition in order to ensure satisfactory bonding.

At present there is thus no simple, strong solution for bonding and holding all types of flexible floor coverings, in particular floor coverings having a significant dimensional variability, which can be easily and quickly removed subsequently, in order to retrieve on the one hand the original substrate for renovation, and on the other hand the original flexible covering for recycling.

SUMMARY OF THE INVENTION

The purpose of the present invention is to provide an adhesive composition at least partially overcoming the abovementioned drawbacks.

To this end, the present invention proposes an adhesive composition comprising:
a) from 30% to 45% by weight of dry matter with respect to the total weight of the adhesive composition, of at least one natural or synthetic latex,
b) from 5% to 40% by weight of dry matter with respect to the total weight of the adhesive composition, of at least one polymer composition having a glass transition temperature ranging from −50° C. to 0° C., said polymer composition comprising:
  i) at least one copolymer or a mixture of at least two polymers comprising at least one (meth)acrylate or (meth)acrylic monomer, and/or
  ii) at least one mixture of at least two polymers comprising at least one polyester and at least one polyurethane, and/or
  iii) at least one vinyl acetate and ethylene copolymer.
c) from 5% to 40% by weight with respect to the total weight of the adhesive composition of at least one filler.

According to an embodiment of the invention, the latex represents from 30% to 40%, preferably from 31% to 38% by weight of dry matter with respect to the total weight of the adhesive composition.

According to an embodiment of the invention, the polymer composition represents from 6% to 25%, preferably from 10% to 20% by weight of dry matter with respect to the total weight of the adhesive composition.

According to an embodiment of the invention, the filler has an apparent density ranging from 0.60 to 1.80, preferably from 1.30 to 1.70.

According to an embodiment of the invention, the mixture of fillers has an apparent density ranging from 0.60 to 1.80, preferably from 1.30 to 1.70.

According to an embodiment of the invention, the filler(s) represent(s) from 15% to 35%, preferably from 20% to 30% by weight of the total weight of the composition.

According to an embodiment of the invention, the filler is a mineral filler, preferably selected from calcium carbonate, magnesium carbonate, sand, alumina, hydrated alumina, magnesium silicate, aluminium silicate, sodium silicate, potassium silicate, mica and silica.

According to an embodiment of the invention, the polymer composition has a glass transition temperature ranging from −40° C. to −10° C., preferably ranging from −37° C. to −15° C.

According to an embodiment of the invention, the polymer composition is a vinyl acetate, ethylene and acrylate terpolymer.

According to an embodiment of the invention, the polymer composition comprises a vinyl acetate, ethylene and acrylate terpolymer and a mixture of polyester and polyurethane.

According to an embodiment of the invention, the adhesive composition also comprises fibres, preferably cellulose fibres, glass fibres, rubber fibres, natural fibres, such as cotton, viscose, jute, sisal, or synthetic fibres, such as polyamide, polyester, polyacrylonitrile, polypropylene, polyethylene.

The present invention also proposes a membrane obtained by drying the adhesive composition according to the invention.

The present invention also relates to the combination of a flexible surface covering with an adhesive composition according to the invention.

The present invention also proposes a method of application of a flexible surface covering onto a substrate comprising the following steps:
a) applying a layer of adhesive composition according to the invention onto the substrate,
b) adhering the flexible covering onto the substrate.

According to an embodiment of the invention, the flexible covering is a covering having a maximum dimensional variability measured according to the Freudenberg test greater than or equal to 0.2%.

According to an embodiment of the invention, the quantity of adhesive composition applied is greater than or equal to 200 g/m², preferably greater than or equal to 250 g/m², yet more preferably greater than or equal to 300 g/m², more particularly greater than or equal to 350 g/m².

According to an embodiment of the invention, the application method comprises before step a), a step of applying a weft or a woven or non-woven reinforcing tape onto the substrate.

The invention also proposes a substrate covered with a peelable adhesive membrane according to the invention and a flexible surface covering.

According to an embodiment of the invention, the flexible surface covering is a flexible surface covering having a maximum dimensional variability measured according to the Freudenberg test greater than or equal to 0.2%.

The invention also proposes a method for renovating a substrate according to the invention, comprising a step of lifting the flexible surface covering.

The invention also proposes the use of the adhesive composition according to the invention, for holding a flexible surface covering having a maximum dimensional variability measured according to the Freudenberg test greater than or equal to 0.2%.

The advantages of the present invention are the following:
the adhesive composition of the invention makes it possible to bond and hold all types of coverings, in particular coverings having a high dimensional variability, without having to use an additional strong adhesive,
the composition of the invention makes it possible, after drying, to easily separate the flexible covering from the substrate, while leaving the support and the covering intact with practically no adhesive residue,
the composition of the invention is an adhesive composition which, after drying, forms a peelable film, also called a membrane. A single composition therefore makes it possible to ensure the bonding and the subsequent unsticking of the covering,
the adhesive composition of the invention offers long-lasting bonding suited to high-traffic premises,
the adhesive composition of the invention is equally suitable for application onto floors and walls,
the method of application of the surface covering of the invention is simple to implement since it requires the application of a single layer of adhesive only,
the method for bonding the surface covering of the invention does not require the use of several coverings one of which would remain durably fixed to the floor,
the covering and the peelable adhesive of the invention can be removed manually, without requiring the use of scraper-type tools. The film originating from the drying of the adhesive composition can be removed from the substrate or from the covering without use of chemicals and without using particular mechanical equipment,
the invention allows recycling of the covering, after unsticking and removing (or lifting) the peelable film, the latter being free from adhesive residue.

Other characteristics and advantages of the invention will become apparent on reading the following description of a preferred embodiment of the invention, given by way of example, and with reference to the attached drawing.

BRIEF DESCRIPTION OF THE FIGURES

FIG. 3 is a diagram illustrating a method for bonding a flexible covering (2) involving a weft or a woven or non-woven reinforcing tape (5).

FIG. 3a shows in perspective the initial substrate 3. FIG. 3b shows in perspective the substrate 3 on which a weft 5 is placed. FIG. 3c shows in perspective the substrate 3 covered by the weft 5 to which the adhesive composition 1 is applied using an applicator 6. FIG. 3d shows in cross-section the substrate 3 covered by the adhesive composition 1. FIG. 3e shows the adhesive composition 1 comprising the weft 5.

FIG. 5 is a diagram illustrating the Freudenberg test device.

FIG. 5a is a diagrammatic representation of the device used for the Freudenberg test.

FIG. 5b shows location of reference points A-D on the covering.

DETAILED DESCRIPTION OF THE INVENTION

Figure 1:
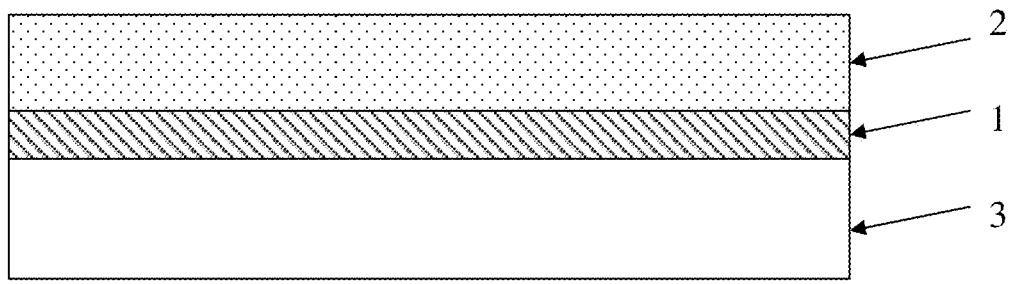
FIG. 1 is a diagram representing an embodiment of the invention after application of the peelable adhesive (1) and of the flexible covering (2) onto a substrate (3).

The present invention proposes a peelable adhesive composition comprising:
from 30 to 45% by weight of dry matter with respect to the total weight of the adhesive composition of at least one natural or synthetic latex,
from 5% to 40% by weight of dry matter with respect to the total weight of the adhesive composition, of at least one polymer composition having a glass transition temperature ranging from −50° C. to 0° C., said polymer composition comprising:
- at least one copolymer or mixture of at least two polymers comprising at least one (meth)acrylate or (meth)acrylic monomer, and/or
- at least one mixture of at least two polymers comprising at least one polyester and at least one polyurethane, and/or
- at least one vinyl acetate and ethylene copolymer, from 5% to 40% by weight of at least one filler.

By peelable adhesive composition is meant an adhesive composition which, after application onto a substrate and drying, forms a film or membrane which can be easily removed without leaving residues.

According to the present invention, the latex can be a natural latex for example obtained from the rubber tree or a synthetic latex which can be obtained by polymerization of isoprene. Among the latexes which can be used in the adhesive compositions according to the invention, the emulsions of polyisoprenoid-type polymers may be mentioned.

Preferably, the latex is a natural latex. In particular, the natural latex can be a natural latex of standard grade, a natural latex having a low ammonia content, a natural latex having a high ammonia content. Generally, water represents from 30% to 45% of the weight of the natural latex, typically 38.5% of the weight of the natural latex.

Preferably, the natural latex is a natural latex having an ammonia content ranging from 0.05 to 1% by weight with respect to the weight of natural latex. It is possible to choose a natural latex having a low ammonia content, i.e. generally ranging from 0.05% to 0.4%, preferably less than 0.1% by weight with respect to the weight of natural latex, or a natural latex having a high ammonia content, i.e. generally ranging from 0.5 to 1% by weight with respect to the weight of natural latex. It is well known to a person skilled in the art that ammonia makes it possible to stabilize natural latex.

The copolymers or polymers used in the invention in order to form the polymer composition, can be in the form of an aqueous emulsion or in the form of a redispersible powder which, after addition of water, forms an aqueous solution. The form in which the copolymer or mixture of polymers is used depends on its solubility in water.

According to an embodiment of the invention, the filler(s) have an apparent density ranging from 0.60 to 1.80, preferably from 1.30 to 1.70.

In the case where the adhesive composition comprises a mixture of several different fillers (difference of chemical nature and/or of properties), each filler taken individually has preferably an apparent density ranging from 0.10 to 1.80.

According to an embodiment, the fillers have an apparent density ranging from 0.60 to 1.80 and each filler taken individually has an apparent density ranging from 0.10 to 1.80. Indeed, it is possible to provide a mixture of at least two fillers, at least one filler having an apparent density ranging from 0.10 to 1.00 and at least one filler having an apparent density higher than 1.00 and less than or equal to 1.80.

The apparent density is measured by standard methods well known to a person skilled in the art, for example by weighing a determined volume as described in the experimental part of the present invention. The apparent density is defined by the ratio of the mass of the material to the apparent volume of all of the particles.

The presence of the filler makes it possible to control and increase the thickness of the peelable adhesive film without increasing its cost. A greater thickness increases the cohesion of the film and facilitates its removal after drying.

According to an embodiment of the present invention, the filler is a mineral filler. Preferably the filler is selected from calcium carbonate, magnesium carbonate, sand, alumina, hydrated alumina, magnesium silicate, aluminium silicate, sodium silicate, potassium silicate, mica and silica. More particularly, the filler is selected from calcium carbonate and sand.

It is also possible to envisage the use of one or more organic fillers, alone or in combination with one or more mineral fillers.

The natural latex represents from 30% to 45% by weight of dry matter with respect to the total weight of the adhesive composition, preferably from 30% to 40% by weight of dry matter with respect to the total weight of the adhesive composition, yet more preferably from 31% to 38% by weight of dry matter with respect to the total weight of the adhesive composition.

The polymer composition represents from 5 to 40% by weight of dry matter with respect to the total weight of the adhesive composition, from 6% to 25% by weight of dry matter with respect to the total weight of the adhesive composition, yet more preferably from 10% to 20% by weight of dry matter with respect to the total weight of the adhesive composition.

According to an embodiment, the ratio (m/m) of the mass of latex (dry mass) to the mass of polymer composition (dry matter) ranges from 0.75 to 4.5, preferably from 1.2 to 2.5.

According to an embodiment, the filler(s) represent(s) from 15% to 35% by weight of the total weight of the adhesive composition, preferably from 20% to 30% by weight of the total weight of the adhesive composition.

In the adhesive composition, water is contributed by the latex, by the aqueous emulsion of copolymer or mixture of polymers and by an optional addition of water. In fact, depending on the dilution of the copolymer or of the mixture of polymers, water may be added in order to obtain the desired concentration of active material.

According to an embodiment, the water represents from 20% to 60% by weight of the total weight of the adhesive composition, preferably from 30% to 50% by weight of the total weight of the adhesive composition.

According to an embodiment of the invention, the peelable adhesive composition comprises one or more other additives chosen from: a thickening agent, a biocide, an antifoaming agent, a latex stabilizer, an odour-masking agent, a pH adjusting agent and/or an antioxidant.

The thickening agent makes it possible in particular to hold the filler(s) in suspension.

Preferably, the thickening agent is an aqueous solution of sodium polyacrylate or an aqueous solution of polyurethane. Generally the thickening agent has a glass transition temperature of the order of 200° C., well above the glass transition temperatures of the copolymers or of the mixtures of polymers defined previously.

Preferably, the thickening agent represents from 0.1 to 5%, preferably from 0.5% to 5% by weight of the total weight of the adhesive composition.

Preferably the other additives represent from 0.5% to 5% by weight of the total weight of the adhesive composition.

Preferably, the polymer composition has a glass transition temperature (Tg) ranging from −40° C. to −10° C., more particularly from −37° C. to −15° C. In a standard manner, well known to a person skilled in the art, the glass transition temperature can be measured by DSC (Differential Scanning calorimetry).

By copolymer comprising at least one (meth)acrylate or (meth)acrylic monomer, is meant a polymer formed from at least two monomers, including a (meth)acrylate or (meth)acrylic monomer.

By mixture of polymers comprising at least one (meth)acrylate or (meth)acrylic monomer, is meant a mixture comprising at least two polymers of which at least one polymer is formed from (meth)acrylate or (meth)acrylic monomers.

According to an embodiment, the (meth)acrylate or (meth)acrylic monomer is chosen from acrylic acid, methacrylic acid, methyl acrylate, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethyl hexyl acrylate, ethylhexyl methacylate, n-heptyl acrylate, n-heptyl methacrylate, stearyl acrylate, stearyl methacrylate, glycidyl methacrylate, acrylamide, methacrylamide, hydroxyethyl acrylate, hydroxyethyl methacrylate, allyl methacrylate, cyclohexyl acrylate, cyclohexyl methacrylate, 2-ethoxyethyl-acrylate, 2-ethoxyethyl-methacrylate, isodecyl acrylate, isodecyl methacrylate, 2-methoxy acrylate, 2-ethoxy-methacrylate, 2-(2-ethoxyethoxy)-ethylacrylate, 2-phenoxyethyl acrylate, 2-phenoxyethyl methacrylate, isobornyl acrylate, isobornyl methacrylate, caprolactone acrylate, caprolactone methacrylate, polypropylene glycol monoacrylate, polypropylene glycol monomethacrylate, polyethylene glycol acrylate, polyethylene glycol methacrylate, benzyl acrylate, benzyl methacrylate.

According to a particular embodiment of the invention, the polymer composition having a glass transition temperature ranging from −50° C. to 0° C. comprises at least one copolymer or a mixture of at least two polymers comprising at least one (meth)acrylate or (meth)acrylic monomer.

According to a particular embodiment of the invention, the polymer composition having a glass transition temperature ranging from −50° C. to 0° C. consists essentially of one or more copolymers or a mixture of at least two polymers comprising at least one (meth)acrylate or (meth)acrylic monomer.

According to an embodiment, the copolymer or the mixture of polymers comprising at least one (meth)acrylate or (meth)acrylic monomer comprises one or more other monomers chosen from vinyl acetate, ethylene, styrene, vinyl chloride, vinyl versatate and vinyl laurate.

According to an embodiment, the copolymer comprising at least one (meth)acrylate or (meth)acrylic monomer is a vinyl acetate, ethylene and acrylate terpolymer.

According to an embodiment of the invention, the polymer composition having a glass transition temperature ranging from −50° C. to 0° C. comprises at least one mixture of at least two polymers comprising at least one polyester and at least one polyurethane.

Preferably, the polymer composition consists essentially of a mixture of polyesters and polyurethanes.

According to an embodiment, the polyurethanes are obtained from at least one polyol and at least one polyisocyanate.

Advantageously, the polyols are chosen from ethylene glycol, 1,2-propylene glycol, 1,3-propylene glycol, 1,4-butanediol, 1,3-butanediol, 1,4-butenediol, 1,4-butynediol, 1,5-pentanediol, 1,6-hexanediol, 1,8-octanediol, neopentylglycol, cyclohexanedimethanol, 2-methyl-1,3-propanediol, 1,5-pentanediol, diethylene glycol, triethylene glycol, tetraethylene glycol, polyethylene glycol, dipropylene glycol, polypropylene glycol, dibutylene glycol and polybutylene glycol.

Preferably, the polyisocyanates are chosen from the linear or branched diisocyanates comprising an alkylene chain of 4 to 14 carbon atoms, cycloaliphatic diisocyanates comprising from 6 to 12 carbon atoms, aromatic diisocyanates comprising from 8 to 14 carbon atoms, polyisocyanates comprising isocyanurates, uretdione diisocyanates, diisocyanates comprising biurets, polyisocyanates comprising urethane and/or allophanate groups, polyisocyanates comprising oxadiazinetrione groups, uretonimine-modified polyisocyanates, or mixtures thereof.

According to an embodiment, the diisocyanates are chosen from tetramethylene diisocyanate, hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, 1,4-diisocyanatocyclohexane, 1,3-diisocyanatocyclohexane, 1,2-diisocyanatocyclohexane, 4.4'-di(isocyanatocyclohexyl)methane, 1,4-diisocyanatocyclohexene, 1,3-diisocyanatocyclohexene, 1,2-diisocyanatocyclohexene, isophorone diisocyanate (IPDI), 2,4-diisocyanato-1-methylcyclohexane, 2,6-diisocyanato-1-methylcyclohexane, 2,4-diisocyanatotoluene, 2,6-diisocyanatotoluene, tetramethylxylylene diisocyanate, 1,4-diisocyanatobenzene, 4.4'-diisocyanatodiphenylmethane, 2,4-diisocyanatodiphenylmethane, p-xylylene diisocyanate and isopropenyldimethyltolylene diisocyanate.

According to an embodiment, the polyesters are chosen from the polyol polyesters. Preferably, the polyesters are obtained from polycarboxylic acids and/or polycarboxylic anhydrides and/or polycarboxylates and polyols.

The polycarboxylic acids can be aliphatic, cycloaliphatic, aromatic or heterocyclic, they can be unsubstituted or substituted, for example with a halogen, and they can be saturated or unsaturated.

According to an embodiment, the polycarboxylic acids, the polycarboxylic anhydrides are chosen from succinic acid, adipic acid, suberic acid, azelaic acid, sebacic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid.

Among the polyols which can be used for manufacturing the polyester, ethylene glycol, 1,2-propylene glycol, 1,3-propylene glycol, 1,4-butanediol, 1,3-butanediol, 1,4-butenediol, 1,4-butynediol, 1,5-pentanediol, 1,6-hexanediol, 1,8-octanediol, neopentylglycol, cyclohexanedimethanol, 2-methyl-1,3-propanediol, 1,5-pentanediol, diethylene glycol, triethylene glycol, tetraethylene glycol, polyethylene glycol, dipropylene glycol, polypropylene glycol, dibutylene glycol and polybutylene glycol may be mentioned.

According to an embodiment of the invention, the polymer composition having a glass transition temperature ranging from −50° C. to 0° C. comprises at least one vinyl acetate and ethylene copolymer.

According to an embodiment of the invention, the polymer composition having a glass transition temperature ranging from −50° C. to 0° C. comprises a mixture of:
 at least one copolymer or a mixture of at least two polymers comprising at least one (meth)acrylate or (meth)acrylic monomer as defined above, and
 at least one mixture of at least two polymers comprising at least one polyester and at least one polyurethane as defined above.

According to an embodiment of the invention, the polymer composition having a glass transition temperature ranging from −50° C. to 0° C. consists essentially of a mixture of:
one or more copolymers or a mixture of at least two polymers comprising at least one (meth)acrylate or (meth)acrylic monomer as defined above, and
a mixture of at least one polyester and at least one polyurethane as defined above.

According to an embodiment of the invention, the fillers have an apparent density ranging from 0.60 to 1.80, preferably from 1.30 to 1.70, more preferably from 1.40 to 1.60.

As indicated previously, it is possible to provide a mixture of several fillers, said mixture having an apparent density ranging from 0.60 to 1.80, preferably from 1.30 to 1.70, more preferably from 1.40 to 1.60, each filler taken individually having an apparent density ranging from 0.10 to 1.80.

Preferably, the filler has a particle size ranging from 10 to 400 p.m.

A person skilled in the art can adjust the proportions and the selection of the monomers in order to obtain a copolymer or a mixture of polymers having the desired glass transition temperature.

The emulsions of (co)polymer(s) which can be used for the preparation of the adhesive composition of the invention are commercially available. The following products may be mentioned:

PLEXTOL® D 306 (available from Synthomer): aqueous dispersion of pure acrylic resin based on n-butylacrylate (98%) and styrene (2%) having a glass transition temperature of −30° C., VINNAPAS® EAF 68 (available from Wacker): aqueous dispersion of acrylic resin based on vinyl acetate, ethylene and acrylate having a glass transition temperature of −35° C., ACRONAL® A 380 (available from BASF): aqueous dispersion of acrylic resin based on acrylate(s) and acrylonitrile having a glass transition temperature of −22° C., LUPHEN® D DS 3548 (available from BASF): dispersion of a resin based on ester and urethane having a glass transition temperature of −46° C., VINNAPAS® EP 8010 (available from Wacker): Aqueous dispersion of resin based on vinyl acetate (83%) and ethylene (17%) having a glass transition temperature of −10° C.

According to an embodiment of the invention, the peelable adhesive composition also comprises fibres such as cellulose fibres, glass fibres, rubber fibres, natural fibres, such as cotton, viscose, jute, sisal or synthetic fibres such as polyamide, polyester, polyacrylonitrile, polypropylene polyethylene. Preferably, the fibres represent from 0.01 to 2% by weight with respect to the weight of the peelable adhesive composition.

The fibres make it possible, after drying of the composition, to increase the cohesion of the membrane (or film) thus obtained.

According to an embodiment of the invention, the adhesive composition also comprises up to 10% by weight of a tackifying resin, preferably selected from the colophane esters, terpene resins, phenolic terpene resins and dispersions based on phenolic terpene resin.

The tackifying resin makes it possible to improve the trapping nature of the adhesive. This makes it possible to better hold the materials together once assembled, so that they do not slip and do not move relative to one another. Thus, the adhesive film remains continuous and immobile throughout the setting period and the bonding does not open up.

Another subject of the present invention is a method for manufacturing the peelable adhesive according to the invention. The peelable adhesive is manufactured by simple mixing of the components. Preferably, the latex is added first and the thickening agent last. After manufacture, the adhesive composition is stored away from light and air at a temperature ranging from 5° C. to 40° C., preferably from 10° C. to 30° C.

In the case where the copolymer or mixture of polymers is in the form of a redispersible powder, the copolymer or mixture of polymers is incorporated into the adhesive composition by adding more water in order to obtain an aqueous solution.

Another subject of the present invention relates to a membrane obtained by drying of the peelable adhesive composition according to the invention.

In fact, the peelable adhesive composition according to the invention can be applied onto a substrate, for example the floor, then after drying of said adhesive composition, the latter forms a peelable membrane.

According to an embodiment, the peelable membrane has a thickness greater than or equal to 100 μm, preferably greater than or equal to 125 μm, more particularly greater than or equal to 150 μm. A person skilled in the art can adapt the maximum thickness depending on the conditions of implementation. In fact, it is desirable not to have too great a thickness for a surface covering adhesive bonded onto a substrate. More particularly, the thickness of the peelable membrane (or film) may be less than or equal to 1 millimetre.

According to an embodiment of the invention, the peelable membrane can be obtained by application of the peelable adhesive composition according to the invention to a weft or a non-woven reinforcing tape.

Preferably, the weft is in the form of a mesh of a woven or non-woven material.

The material constituting the weft can be a metal, natural or synthetic fibres or a plastic or in the form of a woven or non-woven reinforcing tape.

A weft made of glass fibre, of polyamide, a metal grid, a non-woven material obtained by fusion of interlaced polypropylene or polyethylene fibres, a woven polyester material may be mentioned According to an embodiment, a covering is applied directly to the peelable membrane. In this case, the substrate and the covering can be unstuck and, after unsticking, have intact surfaces, i.e. free of adhesive residue after removal of the covering.

In the case where a weft is used, the bonding is reinforced and the removal of the membrane from the surface of the covering and from the surface of the substrate is facilitated.

According to an embodiment, the weft is coated with adhesive (pre-glued weft ready for use), i.e. it comprises an adhesive composition, for example an adhesive composition of PSA (pressure sensitive adhesive) type, i.e. a hot melt adhesive composition or an acrylic adhesive composition or an adhesive composition based on poly(styrene-isoprene-styrene) or an adhesive composition based on poly(styrene-butadiene-styrene). According to this embodiment, the weft is coated with an adhesive composition different from the peelable adhesive composition according to the invention. According to this embodiment, the weft is better held on the floor, which facilitates the subsequent application of the peelable adhesive composition according to the invention.

Another subject of the present invention is the combination of a flexible surface covering with a peelable adhesive composition according to the invention.

In fact, it may be wise to combine, in a kit intended for professionals or private individuals, a flexible surface covering and an adhesive composition in quantities suited to the surface to be covered.

A weft may also form part of the kit.

The flexible surface coverings used in the invention are those which satisfy the conditions laid down in the standards DTU 53.1 and 53.2.

The adhesive composition according to the present invention is quite particularly suitable for bonding and holding flexible surface coverings having a high dimensional variability, preferably flexible surface coverings having a maximum dimensional variability greater than or equal to 0.2%, preferably greater than or equal to 0.3%, preferably ranging from 0.3% to 1%, yet more preferably ranging from 0.4 to 0.8%.

The maximum dimensional variability of the covering is measured according to the Freudenberg test as described in the experimental part. The maximum dimensional variability corresponds to the maximum dimensional variation value measured in one of the directions AB, AC, CD or BD (see FIG. 5).

Among the coverings with high dimensional variability which can be utilized in the present invention, the coverings made of rubber or luxury vinyl tiles or laminates (LVT) may be mentioned.

However, the adhesive composition according to the present invention can be used for bonding and holding other types of coverings, such as carpets or polymer floor coverings, for example made of PVC, or linoleum coverings. More particularly rubber tiles or rolls may be mentioned.

Among these types of coverings, knitted, tufted, woven and flocked carpets, in rolls or in tiles, may be mentioned, in particular those which meet the requirements of NF EN 1307, as well as needled floor coverings in rolls or in tiles, in particular those which meet the requirements of NF EN 1470 and prEN 13297. Conventional wool or synthetic carpets, and natural-fibre coverings may be mentioned.

Among the polymer coverings, the following examples may be mentioned (see the standard DTU 53.2):

homogeneous and heterogeneous floor coverings based on polyvinyl chloride floor coverings based on polyvinyl chloride on a jute or polyester support or on a polyester support with a polyvinyl chloride back floor coverings based on polyvinyl chloride on foam floor coverings based on polyvinyl chloride with cork-based support floor coverings based on expanded polyvinyl chloride Semi-flexible tiles based on polyvinyl chloride Cork-agglomerate tiles with a wear layer based on polyvinyl chloride Flexible coverings based on polymers of renewable origin (of agricultural origin in particular) such as PLA (polylactic acid) or polyolefin polymers (the olefin originating in particular from bio-ethanol).

It is therefore possible to use in the invention a large number of different coverings, for example the following coverings:

homogeneous P.V.C. (tiles or rolls)

multilayer P.V.C (tiles or rolls)

P.V.C on cork

Polyolefins

Linoleum rolls

Rubbers in tiles or rolls

Expanded relief vinyls (E.R.V.)

Semi-flexible tiles

Needled coverings with or without back

Carpets on foam (latex)

Carpets with non-woven back

Carpets with synthetic backs (Action Back type)

Coconut, sisal and seagrass with latexed back.

Another subject of the invention relates to a method for applying a flexible surface covering onto a substrate comprising the following steps:

a) applying a layer of peelable adhesive composition according to the invention onto the substrate, b) adhering the flexible surface covering onto the substrate.

The substrate to which the covering of the invention is applied is any conventional support receiving this type of covering. For example surfaced concretes (in particular with a finished facing), cement-based screeds (incorporated or added), anhydrite screeds, levellers, old (previous) tiles, suitable smoothed old (previous) parquet flooring, chipboard or plywood panels, conventional wall facings may be mentioned.

Adhering the flexible surface covering onto the substrate corresponds to the action of applying or placing the covering on the substrate covered with the layer of peelable adhesive composition.

According to a preferred embodiment, the flexible surface covering is a covering with high dimensional variability, preferably a flexible surface covering having a maximum dimensional variability greater than or equal to 0.2%, preferably greater than or equal to 0.3%, preferably ranging from 0.3% to 1%, yet more preferably ranging from 0.4 to 0.8%, measured according to the Freudenberg test described in the experimental part.

Preferably, the flexible surface covering is chosen from the coverings made of rubber and luxury vinyl tiles or laminates (LVTs).

According to an embodiment of the invention, the quantity of peelable adhesive composition is greater than or equal to 250 g/m$^2$, preferably greater than or equal to 300 g/m$^2$, more particularly greater than or equal to 350 g/m$^2$.

The application of the peelable adhesive composition onto the substrate is carried out continuously or discontinuously.

Preferably, the layer of adhesive is applied directly onto the substrate. The substrate is generally not primed before application of the layer of adhesive. For example a tile floor undergoes simple scraping before application of the layer of adhesive. The substrates are those mentioned in the standard DTU 53.1.

In a standard manner, the flexible surface covering is laid after satisfying a gumming time ranging from 10 to 45 minutes. The gumming time corresponds to the period during which the adhesive composition applied thickens and increases its adhesion.

Preferably, the application method of the invention has an additional step c) of roller-pressing in order to facilitate the transfer of the adhesive to the back of the flexible covering. This step makes it possible in particular to spread the adhesive composition in order to make the adhesive composition applied continuous or substantially continuous on the substrate.

The user can lay the flexible covering within a time interval defined by the working time which is of the order of 30 minutes and which can be modulated by the addition of additives. The working time starts to run at the end of the gumming time and ends at the moment when the adhesive has lost its adhesive character.

After drying of the adhesive composition, a film (also called a membrane) of peelable adhesive is obtained.

According to an embodiment, the peelable adhesive film or membrane has a thickness greater than or equal to 100 μm, preferably greater than or equal to 125 μm, more particularly greater than or equal to 150 μm. A person skilled in the art can adapt the maximum thickness depending on the conditions of implementation. In fact, it is desirable not to have too great a thickness for a surface covering bonded onto a substrate. More particularly, the thickness of the peelable adhesive film can be less than or equal to 1 millimetre.

The invention applies preferentially to floor coverings, but can also be applicable to walls.

According to a particular embodiment of the method of application of a flexible surface covering according to the invention, a weft is placed on the substrate before step a) of applying the layer of peelable adhesive composition.

Preferably, the weft is in the form of a mesh, of a woven or non-woven material or of a non-woven reinforcing tape.

The material constituting the weft can be a metal, natural or synthetic fibres or a plastic.

For example, a weft made of glass fibre, polyamide, a metal grid, a non-woven material obtained by fusion of interlaced polypropylene or polyethylene fibres, a woven polyester material may be mentioned.

FIG. 3 illustrates a particular embodiment of the invention. FIG. 3a shows in perspective the initial substrate 3. FIG. 3b shows in perspective the substrate 3 on which a weft 5 is placed. FIG. 3c shows in perspective the substrate 3 covered by the weft 5 to which the adhesive composition 1 is applied using an applicator 6. FIG. 3d shows in cross-section the substrate 3 covered by the adhesive composition 1. The weft 5 is then impregnated with the adhesive composition 1. Then, a flexible covering 2 is applied onto the adhesive composition 1 comprising the weft 5, as illustrated in FIG. 3e.

Alternatively, the weft can be pre-glued with an adhesive composition, different from the peelable adhesive composition according to the invention, for example with an adhesive composition of PSA type, i.e. a thermofusible adhesive composition or an acrylic adhesive composition or an adhesive composition based on poly(styrene-isoprene-styrene) or an adhesive composition based on poly(styrene-butadiene-styrene) etc. Preferably, the application method is followed by an additional step c) of roller-pressing.

Another subject of the present invention is a substrate covered with the peelable film according to the invention and the flexible surface covering.

FIG. 1 represents the flexible covering 2 bonded onto a substrate 3 by means of the peelable adhesive 1 according to the invention.

Another subject of the present invention is a method for renovating a substrate comprising a surface covering, this method comprising a step of lifting a flexible covering according to the invention.

The lifting of the surface covering corresponds to the action of stripping away, taking off, unsticking or pulling away the covering.

The lifting step is carried out by exerting a pealing force on the covering so that the layer constituted by the peelable adhesive film at the peelable film/substrate and peelable film/flexible covering interface pulls away easily, leaving the substrate and the flexible covering as they were before the bonding.

Figure 2:
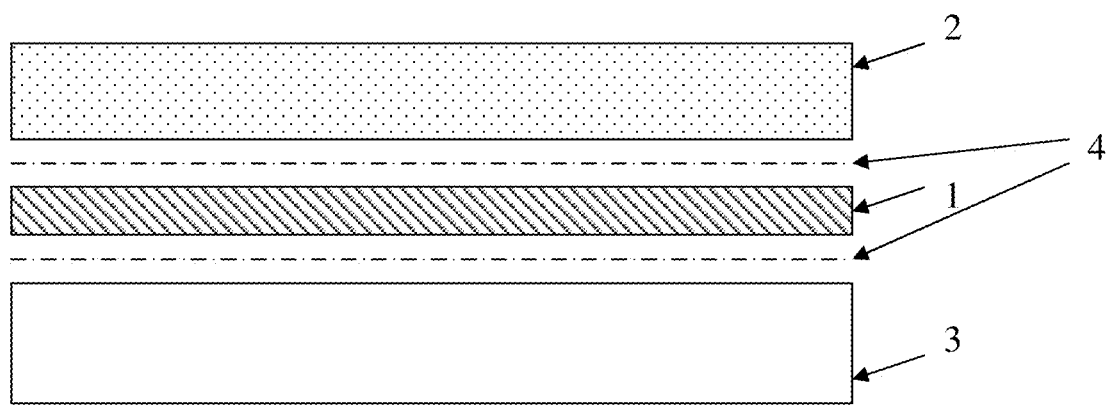
FIG. 2 is a diagram representing the state of the substrate (3) and of the flexible covering (2) after renovation.

The renovation method according to an embodiment of the invention makes it possible to obtain a substrate and a flexible covering both free from adhesive residues (FIG. 2). The failure, shown diagrammatically in FIG. 2 by the lines 4, is adhesive.

According to an embodiment of the invention, the renovation method comprises an additional step of recycling the flexible covering.

After lifting the flexible covering, the substrate can immediately be re-covered with a new covering and the covering can be recycled.

Another subject of the present invention relates to the use of the adhesive composition according to the invention for holding a flexible surface covering having a maximum dimensional variability measured according to the Freudenberg test greater than or equal to 0.2%.

The adhesive composition according to the invention effectively makes it possible to hold the flexible surface coverings having a high dimensional variability. As indicated in the experimental part, the covering bonded onto a substrate using the adhesive composition according to the invention produces an overall variation (as defined in the experimental part and calculated in Table 2) less than or equal to 0.10%.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 14/55.130, filed Jun. 5, 2014, are incorporated by reference herein.

EXAMPLES

Different adhesive compositions were prepared and the performances of these compositions were tested.

The compositions A, B and C are according to the document EP2610317 and do not form part of the invention.

The compositions 1 and 2 are peelable adhesive compositions according to the present invention.

The following copolymers were used:
VINNAPAS® EAF 68: Aqueous dispersion of acrylic resin based on vinyl acetate, ethylene and acrylate with Tg=−35° C.,
LUPHEN® D DS 3548 (available from BASF): dispersion of a resin based on ester and urethane having a glass transition temperature of −46° C.

The natural latex used in the examples is a natural latex Ulacol®—3 available from Thai Regitex Co, Ltd, comprising 60% dry extract.

The apparent density of the fillers was measured according to the following procedure:
a cup with a capacity of approximately V=500 ml, calibrated (mass of the cup Mo=500 g), is put in position directly below a stainless steel funnel with a capacity of approximately 600 ml;
the hollow bottom of the funnel is closed with a slide, the slide making it possible to ensure the opening and closing of the hollow bottom of the funnel);

the funnel is completely filled with the homogenized filler(s), and the slide is rapidly removed, thus allowing the filler(s) to flow into the cup;

the superfluous fillers are slowly leveled off using a flat rule (an equivalent instrument may be suitable), and the outside of the cup is carefully cleaned with a dry cloth (a brush can be used), the cup is placed on an analytical balance accurate to 0.1 g and the cup and its content, mass M1, are weighed with an accuracy of 0.1 g.

The apparent density is then calculated as being: $d=(M1-Mo)/V$. In this formula, M1 and Mo are expressed in grams, the volume is expressed in $cm^3$.

The compositions illustrated in the experimental part are described in Table 1 below.

TABLE 1

| Composition (% by weight) | A | B | C | 1 | 2 |
|---|---|---|---|---|---|
| VINNAPAS ® EAF 68 (% dry weight) | 9.00 | 9.00 | 9.00 | 9.00 | 4.20 |
| LUPHEN ® D DS 3548 (% dry weight) | 3.60 | 3.60 | 3.60 | 3.60 | 1.80 |
| Natural latex (% dry weight) | 6.00 | 18.00 | 28.00 | 30.00 | 45.00 |
| water | 56.20 | 45.50 | 34.20 | 32.20 | 34.00 |
| Filler $CaCO_3$ 350 μm | 22.05 | 20.85 | 22.05 | 22.05 | 11.80 |
| apparent density of the fillers | 1.7 | 1.7 | 1.7 | 1.7 | 1.7 |
| thickening agent: aqueous solution of sodium polyacrylate | 0.80 | 0.80 | 0.80 | 0.80 | 0.80 |
| Biocide BT ® 20 | 0.11 | 0.11 | 0.11 | 0.11 | 0.11 |
| pH adjuster - 30% soda | 0.17 | 0.17 | 0.17 | 0.17 | 0.17 |
| 20% N stabilizer (fatty alcohol polyglycol ether) | 1.30 | 1.30 | 1.30 | 1.30 | 1.30 |
| Filler dispersant Ecodis ® P 90 (ammonium polyacrylate) | 0.15 | — | 0.15 | 0.15 | 0.15 |
| Anti-UV Aquanox ® LSF | 0.35 | 0.35 | 0.35 | 0.35 | 0.35 |
| Anti-foam Foamaster ® NXZ | 0.20 | 0.20 | 0.20 | 0.20 | 0.20 |

Dimensional Variability of the Bonded Covering

The dimensional variability of a rubber-type covering is assessed with the Freudenberg test. The rubber used is a Nora covering with a thickness of 2 mm.

FIG. 5a is a diagrammatic representation of the device used for the Freudenberg test. The component 51 represents the thermostat, the component 52 represents a ceramic heating element, the component 53 represents the test specimen and the component 54 represents the support on which the specimen is positioned.

The preparation of the specimens is carried out in accordance with the standard EN 1903:

the adhesive composition tested is applied to a fibrocement-type substrate, the covering made of rubber measuring 25 cm×25 cm is applied onto the adhesive composition after a gumming time of 15 minutes, reference points are bonded onto the covering at points A, B, C and D (see FIG. 5b), the distance between the points AB, CD, AC and BD is measured, the specimen is then placed at ambient temperature (23° C.) for 24 hours, and is then placed under infra-red irradiation (the temperature is then 50° C. at the surface of the covering) for 4 hours, the distance between the plots AB, CD, AC and BD is then immediately measured (variation X), the specimen is then placed at ambient temperature (23° C.) for 24 hours, the distance between the plots AB, CD, AC and BD is then measured (variation Y).

The measurement of the distances AB and CD assesses the cross-sectional variation and the measurement of the distances AC and BD assesses the longitudinal variation. FIG. 5b shows the positions of the points A, B, C and D on the test piece. The arrow represents the longitudinal direction of the covering made of rubber.

The variation in the covering alone, i.e. covering not bonded to the substrate, is: AB/CD/AC/BD=0.54%/0.54%/0.26%/0.24%.

The maximum dimensional variability of the covering is the maximum variation measured in one of the directions according to the Freudenberg test. For the tested covering made of rubber, the maximum dimensional variability is 0.54%.

As an indication, a dimensional variation of 0.1% in one direction means that for a 1 metre length, there will be a 1 mm variation in the covering and this will therefore be visible at the joints of the covering.

The Freudenberg test results are shown in Table 2 below.

To facilitate comparison between the different adhesive compositions, the overall variation in the covering thus indicated in Table 2 is calculated as follows: Absolute value (maximum variation X)+absolute value (maximum variation Y)

TABLE 2

Dimensional variation in % measured by the Freudenberg test

| | Variation X (24 h to 23° C. and 4 h at 50° C.) | | | | Variation Y (24 h at 23° C., 4 h at 50° C. and 24 h at 23° C.) | | | | Overall variation in the covering |
|---|---|---|---|---|---|---|---|---|---|
| | AB | CD | AC | BD | AB | CD | AC | BD | |
| A | 0.14 | 0.12 | 0.14 | 0.13 | −0.10 | −0.10 | −0.11 | −0.09 | 0.24% |
| B | 0.12 | 0.12 | 0.11 | 0.10 | −0.08 | −0.07 | −0.07 | −0.08 | 0.20% |
| C | 0.10 | 0.10 | 0.10 | 0.09 | −0.04 | −0.05 | −0.04 | −0.05 | 0.15% |
| 1 | 0.06 | 0.06 | 0.05 | 0.06 | −0.04 | −0.03 | −0.03 | −0.03 | 0.10% |
| 2 | 0.01 | 0.02 | 0.01 | 0.02 | −0.02 | −0.02 | −0.03 | −0.02 | 0.03% |

In the light of Table 2, it is clear that the overall dimensional variation of the covering bonded with an adhesive composition according to the invention (Examples 1 and 2) is 0.10% and 0.03% respectively whereas the overall dimensional variation of the covering bonded with an adhesive composition as described in the document EP2610317 varies from 0.15% to 0.24%.

Figure 4:
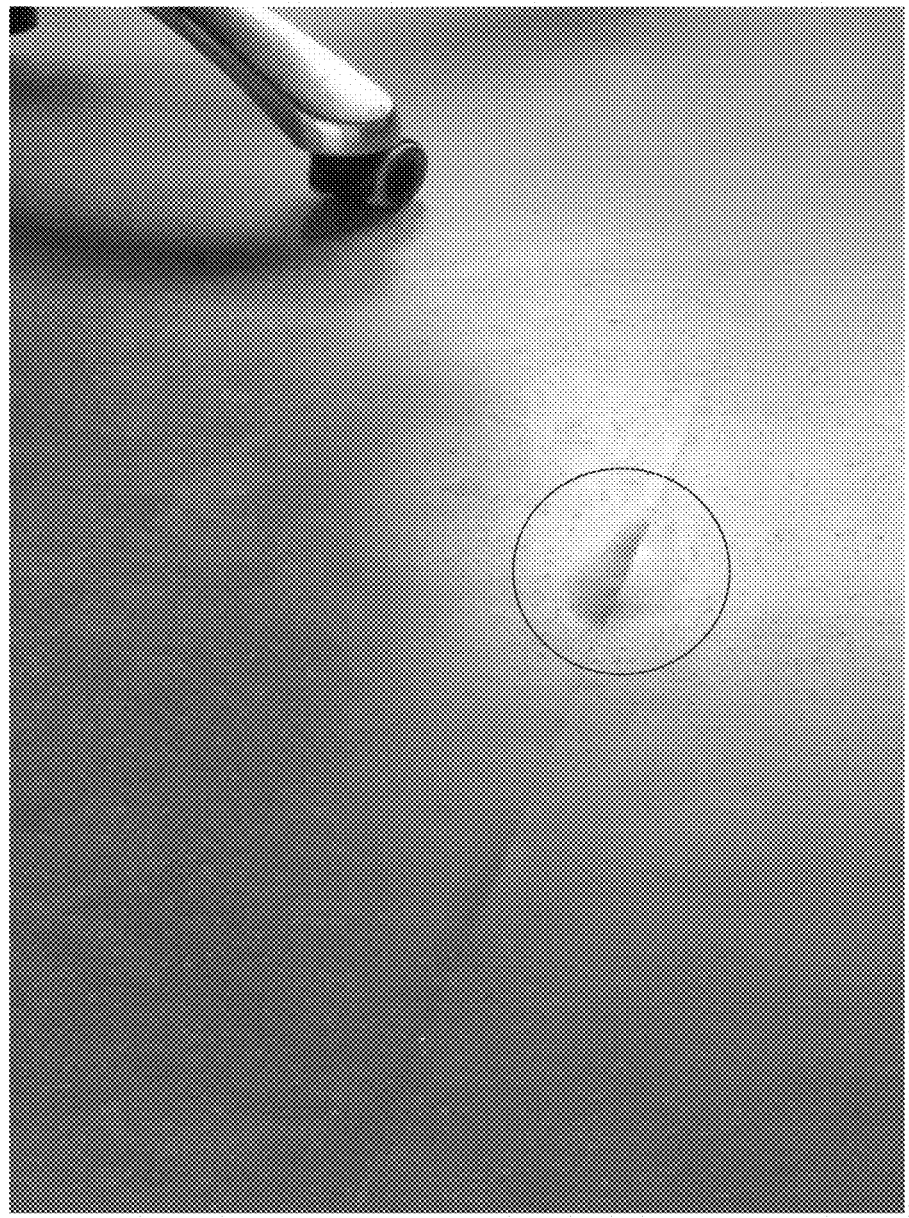
FIG. 4 is a photo illustrating the blistering and lifting phenomenon.

If the overall variation is greater than 0.10%, this means that the adhesive composition does not hold the covering made of rubber sufficiently and lifting up or opening phenomena at the joints of the covering are possible. FIG. 4 shows this bulging and blistering phenomenon at the joints of a covering (see the circle drawn in FIG. 4).

Moreover, the bonding and lifting efficiencies described in the document EP2610317 are retained or even improved by means of the compositions according to the present invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An adhesive composition comprising:
a) from 30% to 45% by weight of dry matter with respect to the total weight of the adhesive composition, of at least one natural latex,
b) from 5% to 25% by weight of dry matter with respect to the total weight of the adhesive composition, of at least one polymer composition having a glass transition temperature ranging from −40° C. to −10° C., said polymer composition comprising:
a vinyl acetate, ethylene and acrylate terpolymer and a mixture of polyester and of polyurethane
c) from 5% to 35% by weight with respect to the total weight of the adhesive composition of at least one filler, consisting of a mineral filler that is calcium carbonate, magnesium carbonate, sand, alumina, hydrated alumina, magnesium silicate, aluminium silicate, sodium silicate, potassium silicate, mica or silica wherein the mineral filler has an apparent density of 0.60 to 1.80.

2. The adhesive composition according to claim 1, wherein
a) the latex represents from 30% to 40% by weight of dry matter with respect to the total weight of the adhesive composition, and/or
b) the polymer composition represents from 6% to 25% by weight of dry matter with respect to the total weight of the adhesive composition, and/or
c) the filler(s) represent(s) from 15% to 35% by weight of the total weight of the composition.

3. The adhesive composition according to claim 1, wherein the at least one filler has an apparent density ranging from 1.30 to 1.70.

4. The adhesive composition according to claim 1, further comprising fibres.

5. An adhesive composition comprising:
(a) from 30% to 45% by weight of dry matter with respect to the total weight of the adhesive composition, of at least one natural latex;
(b) from 5% to 25% by weight of dry matter with respect to the total weight of the adhesive composition, of at least one polymer composition having a glass transition temperature ranging from −40° C. to 10° C., said polymer composition comprising:
a vinyl acetate, ethylene and acrylate terpolymer and a mixture of polyester and of polyurethane
(c) from 5% to 35% by weight with respect to the total weight of the adhesive composition of at least one filler, consisting of a mineral filler that is calcium carbonate, magnesium carbonate, sand, alumina, hydrated alumina, magnesium silicate, aluminium silicate, sodium silicate, potassium silicate, mica or silica, wherein the mineral filler has an apparent density ranging from 0.60 to 1.80,
wherein the adhesive composition is suitable for bonding and holding a flexible surface covering onto a substrate, and the flexible surface covering bonded onto a substrate using the adhesive composition produces an overall variation of less than or equal to 0.10%.

6. A method of application of a flexible surface covering onto a substrate comprising:
a) applying a layer of adhesive composition according to claim 1 onto the substrate,
b) adhering the flexible covering onto the substrate.

7. The method of application according to claim 6, wherein the flexible covering is a covering having a maximum dimensional variability measured according to the Freudenberg test greater than or equal to 0.2%.

8. The method of application according to claim 6, wherein the quantity of adhesive composition applied is greater than or equal to 200 g/m².

9. The method of application according to claim 6, comprising before a), applying a weft or a woven or non-woven reinforcing tape onto the substrate.

10. The method of application according to claim 7, comprising holding the flexible surface covering having a maximum dimensional variability measured according to the Freudenberg test greater than or equal to 0.2%.

11. The method for renovating a substrate coated with a peelable adhesive film, obtained after drying of the adhesive composition according to claim 1, and with a flexible surface covering, said method comprising a step of lifting the flexible surface covering.

* * * * *